April 3, 1934. T. H. ROBERTS 1,953,776
GAS COCK
Filed Jan. 18, 1932
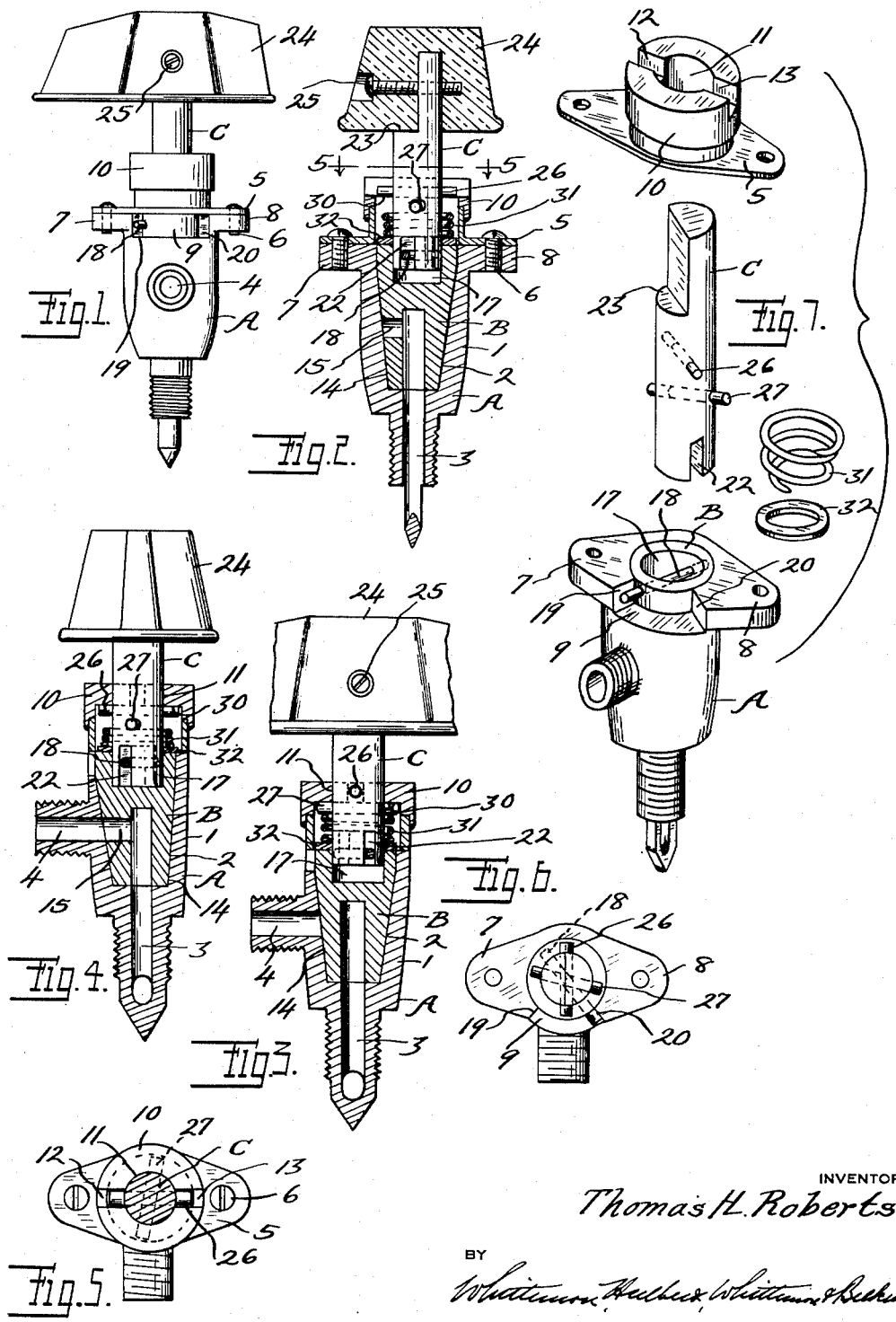
INVENTOR
Thomas H. Roberts
BY
ATTORNEYS Patented Apr. 3, 1934

1,953,776

UNITED STATES PATENT OFFICE 1,953,776

GAS COCK

Thomas H. Roberts, Detroit, Mich., assignor to Roberts Brass Manufacturing Company, Detroit, Mich., a corporation of Michigan Application January 18, 1932, Serial No. 587,398

11 Claims. (Cl. 251—165)

This invention relates generally to valves and refers more particularly to safety gas valves of the rotary plug type.

One of the essential objects of the invention is to provide a valve of this type wherein all of the plug is within a suitable casing and is connected to and operable by a separate handle stem mounted in the casing for both rotary and longitudinal movements.

Another object is to provide a valve wherein the connection between the stem and plug is wholly within the casing and includes a part engageable with portions of the casing to limit the rotary movement of the plug.

A further object is to provide a valve wherein the section aforesaid of the casing is removable and has a portion that serves as a bearing for one of the laterally projecting parts on the stem when the latter is turned and as an abutment or stop for the other laterally projecting part on the stem when the latter is moved longitudinally.

A further object is to provide a valve wherein the portion aforesaid of the removable section of the plug casing has a recess adapted when the plug has been turned by the stem to a predetermined point in the casing to receive one of the laterally projecting parts on the stem and to permit the latter to move longitudinally but that precludes the laterally projecting part and stem from turning after the said part is received therein.

A further object is to provide a valve wherein a spring sleeved about the stem between the plug and one of the lateral projections aforesaid serves to automatically move the stem longitudinally relative to the plug after the latter has been turned by the stem to a predetermined position in the casing, and regardless of the position of the stem in the casing maintains the plug in proper engagement with its seat so that leaks will not occur.

Other objects, advantages and novel details of construction of this invention will be made more apparent as this description proceeds, especially when considered in connection with the accompanying drawing wherein, Figure 1 is a front elevation of a valve embodying my invention with the parts in fully closed position;

Figure 2 is a vertical sectional view through the valve when the parts are in fully closed position;

Figure 3 is a vertical sectional view through the valve taken at substantially right angles to the section line in Figure 2;

Figure 4 is a vertical sectional view through the valve when the latter is in open position;

Figure 5 is a sectional view taken on the line 5—5 of Figure 2;

Figure 6 is a top plan view of the valve with the handle removed and showing the parts in fully open position;

Figure 7 is a perspective view of the parts forming the valve.

Referring now to the drawing, A is the casing; B is the rotary plug; and C is the handle stem of a valve embodying my invention.

As shown, the casing A has a body part 1 provided with a tapered bore 2 and inlet and outlet passages 3 and 4 respectively, and has a removable cover section 5 fastened by bolts 6 to flange portions 7 and 8 respectively of the body part 1. Preferably the body part 1 is provided at one end around part of the bore 2 with an arcuate recess 9 and the cover section 5 is provided in alignment with the bore 2 with an inverted cup-shaped portion 10 having a central opening 11 and slots 12 and 13 respectively at diametrically opposite sides of said opening.

The plug B has a tapered portion 14 engaging the walls of the tapered bore 2 and has an inverted L passage 15 for registration with the inlet and outlet passages 3 and 4 respectively in the body part 1 of the casing. Preferably the plug B terminates substantially even with the upper end of the body part 1 of the casing and is provided in its upper end with a cylindrical upwardly opening socket 17. A pin 18 extends diametrically across this socket and projects into the arcuate recess 9 in the body part 1 of the casing. Thus when the plug B is turned in the casing, the passage 15 will be moved into or out of registration with the passage 4 in the casing, and the pin 18 will be moved accordingly from one end 19 to the other end 20 of the recess 9 in the casing. For example, when the pin 18 abuts the left end 19 of the recess 9, the passage 15 in the plug is out of registration with the passage 4 in the body part of the casing, whereas when the pin 18 abuts the right hand end 20 of the recess 9, the passage 15 will be in full registration with the passage 4.

The stem C is preferably cylindrical in form and fits within the cylindrical socket 17 in the upper end of the plug B. Preferably the stem C is provided at its lower end with a downwardly opening diametrically extending slot 22 that receives the diametrically extending pin 18 in the plug and is cut away at its upper end to provide a proper seat 23 for a suitable handle 24. Any suitable means such as the screw 25 may be used for fastening the handle 24 to the stem C. Pins 26 and 27 respectively extend diametrically of the stem C in closed relation at spaced points longitudinally thereof and are movable with the stem in the cup-shaped portion 10 of the cover section 5. Preferably the upper pin 26 is adapted to be received within the diametrically arranged slots 12 and 13 in the cup-shaped portion 10 when the pin 18 abuts the left end 19 of the arcuate recess 9 in the casing and is movable over the flat lower face 30 of the cup-shaped portion when the pin 18 is in any other position in the arcuate recess 9. When the pin 26 enters the slots 12 and 13 the pin 27 abuts the lower face 30 aforesaid and limits the upward longitudinal movement of the stem C. Any suitable means such as the coil spring 31 sleeved upon the stem C between the pin 27 and a washer 32 on the upper end of the plug B may be used to effect this longitudinal movement of the stem.

In use when the parts are in the position illustrated in Figure 1 the valve is fully closed. Note that the pin 18 is abutting the left end 19 of the arcuate recess 9; the pin 26 is within the slots 12 and 13; and the pin 27 is abutting the bearing face 30 of the section 5. As a result the stem C and plug B can not be accidentally turned or rotated. To open the valve the stem C may be depressed by hand until the pin 26 is removed from the slots 12 and 13 whereupon the stem C and plug B due to the pin 18 and slot 22 connection may rotate in unison to the right until the pin 18 abuts the right hand end 20 of the arcuate recess 9. The valve will then be fully opened. In this connection it will be noted that the pin 27 is spaced from and the pin 26 bears against the bearing face 30 of the section 5. When the stem C is turned to the left so that the pin 26 is in vertical alignment with the slots 12 and 13, the spring 31 will move the stem C upwardly until the pin 27 abuts the bearing face 30. When in this position the pin 26 will be in the slots 12 and 13 and the plug B can not be turned without first pressing the stem downwardly as aforesaid.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. In a valve, a casing having a seat for a rotary plug, a rotary plug within the casing and engaging said seat, a cover for the casing having an inverted cup-shaped portion in alignment with the plug, the base of said cup-shaped portion having an opening therein and provided at one side of the opening with a radially extending slot, a handle stem extending through the opening and operatively connected to said plug, said stem being movable longitudinally of the plug, and means for holding the plug in engagement with its seat, regardless of the position of the stem longitudinally of the plug, including a coil spring sleeved about the stem within the cup-shaped portion of the cover, and members spaced longitudinally of and projecting laterally from the stem within the cup-shaped portion of the cover, said members being successively engageable with the base of the cover, one of said members being engageable with the slot aforesaid to limit rotation of the plug, and the other of said members constituting an abutment for the spring and operable upon engagement with the base of the cup-shaped portion to limit movement of the other of said members in said slot.

2. In a valve, a casing having a seat for a rotary plug, a rotary plug within the casing and engaging said seat, a cover for the casing having an inverted cup-shaped portion in alignment with the plug, the base of said cup-shaped portion having an opening therein and provided at one side of the opening with a radially extending slot, a handle stem extending through the opening and operatively connected to said plug, said stem being movable longitudinally of the plug, laterally projecting members spaced longitudinally of the stem within the cup-shaped portion of the cover and successively engageable with the base of said cover, one of said members being engageable with the slot aforesaid to hold the plug against turning movement, and yieldable means about the stem between the second mentioned member and plug and adapted to hold the latter in engagement with the seat regardless of which member is in engagement with the base of said cover, the tension of said yieldable means being varied by the successive engagement of said members with the base of the cover.

3. In a valve, a casing having a seat for a rotary plug, a rotary plug within the casing and engaging said seat, a cover for the casing having an inverted cup-shaped portion in alignment with the plug, the base of said cup-shaped portion having an opening therein and provided at one side of the opening with a radially extending slot, a handle stem extending through the opening and operatively connected to said plug, said stem being movable longitudinally of the plug, a member projecting laterally from the stem and successively engageable with the under-side of said base and with said slot, a second member projecting laterally from the stem, spaced from the base when the first mentioned member is in engagement therewith and engageable with the base when the first mentioned member is in engagement with the slot, and yieldable means about the stem between the second mentioned member and plug and operable to hold the plug in engagement with its seat, regardless of which member is in engagement with the base of said cover.

4. In a valve, a casing having a seat for a rotary plug, a rotary plug within the casing and engaging said seat, a cover for the casing having an inverted cup-shaped portion in alignment with the plug, the base of said cup-shaped portion having an opening therein and provided at one side thereof with a substantially radially extending slot, a handle stem extending through the opening and operatively connected to said plug, a member projecting laterally from the stem within the cup-shaped portion and successively engageable with the under-side of said base and with said slot, a second member projecting laterally from the stem in spaced relation to the first member and engageable with the base of said cup-shaped portion when the first mentioned member is in engagement with said slot, the stem being movable longitudinally of the plug to permit the engagement aforesaid of said members with said base, the engagement of the second mentioned member with said base limiting the longitudinal movement of said stem in one direction, and yieldable means about the stem between the second mentioned member and plug and operable to hold the plug in engagement with its seat, regardless of the position of the stem longitudinally of the plug.

5. In a valve, a casing having a seat for a rotary plug, a rotary plug within the casing and engaging said seat, a cover for the casing having an inverted cup-shaped portion in alignment with the plug, the base of said cup-shaped portion having an opening therein and provided at substantially diametrically opposite points of the opening with radially extending slots, a handle stem extending through the opening and operatively connected to said plug, a pin extending transversely of the stem and having opposite ends thereof projecting laterally from the stem at substantially diametrically opposite points thereof, said end portions being successively engageable with the under-side of said base and with the slots in said base, said stem being movable longitudinally of the plug to permit the successive engagement, means projecting laterally from the stem between the pin and plug and engageable with the base to limit longitudinal movement of the stem in one direction when the end portions of the pin are in engagement with the slots, and yieldable means about the stem between the laterally projecting means and plug and operable to hold the plug in engagement with its seat, regardless of the position of the stem longitudinally thereof.

6. In a valve of the rotary plug type, a rotary plug, an operating member therefor including a handle stem rotatable in unison with but movable longitudinally of said plug, said member being provided at spaced points longitudinally thereof with lateral projections, and a casing for the plug enclosing both projections, having a recess for receiving one and having a surface at one side of the recess alternately engageable by both of said projections.

7. In a valve of the rotary plug type, a rotary plug, an operating member therefor including a handle stem rotatable in unison with but movable longitudinally of said plug, said member being provided at spaced points longitudinally thereof with lateral projections, and a sectional casing for said plug receiving said stem and enclosing both of said projections, one section having a seat for the plug, another section having a recess for receiving one of said projections and having a portion at one side of said recess alternately engageably by both of said projections.

8. In a valve, a casing, a rotary plug within the casing, a cover for the casing having an inverted cup-shaped portion in alignment with the plug, the base of said cup-shaped portion having an opening therein and provided at one side of the opening with a radially extending slot, a handle stem extending through the opening and operatively connected to said plug, said stem being movable longitudinally of the plug, and means controlling the rotation of the plug and the longitudinal movement of the stem, including a member projecting laterally from the stem and successively engageable with the underside of said base and with said slot, a second member projecting laterally from the stem in spaced relation to the first mentioned member and engageable with the base when the said first mentioned member is in engagement with the slot, and yieldable means associated with the stem between the plug and second mentioned member.

9. In a valve, a casing having a seat for a rotary plug, a rotary plug within the casing and engaging said seat, an operating member for said plug including a handle stem rotatable in unison with but movable longitudinally of said plug, said stem being provided at spaced points longitudinally thereof with lateral projections, a cover for the casing having a opening receiving the stem, having a recess for receiving one of said projections upon longitudinal movement of the stem, and provided adjacent the recess with an abutment alternately engageable by both of said projections.

10. In a valve, a casing having a seat for a rotary plug, a rotary plug within the casing and engaging said seat, an operating member for said plug including a handle stem rotatable in unison with but movable longitudinally of said plug, said stem being provided at spaced points longitudinally thereof with lateral projections, a cover for the casing having an opening receiving the stem, having a face alternately engageable by both of said projections upon longitudinal movement of the stem and provided in said face with a slot for receiving one of said projections, and means constantly urging said members towards said face and urging the plug in engagement with its seat and operable when the plug has been rotated to a predetermined position relative to its seat to move its stem longitudinally of the plug.

11. In a valve, a casing, a rotary plug in said casing, an operating member for said plug including a longitudinally movable handle stem rotatable in unison with said plug, a cover for said casing having an opening receiving the stem and provided at one side of said opening with a recess, and means controlling the action of the stem and plug including members projecting laterally from the stem at spaced points longitudinally thereof and successively engageable with said cover to limit longitudinal movement of the stem, one of said members being engageable with said recess to limit rotation of the plug.

THOMAS H. ROBERTS.